United States Patent [19]
Bloomquist

[11] Patent Number: 4,553,584
[45] Date of Patent: Nov. 19, 1985

[54] REFRIGERATION/AIR EXCHANGER SYSTEM MAINTAINING TWO DIFFERENT TEMPERATURE COMPARTMENTS

[75] Inventor: Dayton E. Bloomquist, New Hope, Minn.

[73] Assignee: Red Owl Stores, Inc., Minneapolis, Minn.

[21] Appl. No.: 558,932

[22] Filed: Dec. 7, 1983

[51] Int. Cl.[4] .................. F25B 29/00; B60H 3/00; F25D 17/08
[52] U.S. Cl. .................................. 165/30; 165/42; 62/90; 62/239; 62/407; 62/417; 62/186
[58] Field of Search ............... 165/30, 41, 42; 62/90, 62/239, 407, 417, 186, 187

[56] References Cited

U.S. PATENT DOCUMENTS

| | | |
|---|---|---|
| 1,949,735 | 3/1934 | Buckeley . |
| 2,042,384 | 5/1936 | Bird et al. ............... 165/30 |
| 2,206,631 | 7/1940 | Clark . |
| 2,265,633 | 12/1941 | Cornwell . |
| 2,270,524 | 1/1942 | Helwig . |
| 2,398,273 | 4/1946 | Albers et al. ............ 165/30 |
| 2,660,407 | 11/1953 | Lehane . |
| 2,671,643 | 3/1954 | Gordon, Jr. ............. 165/30 |
| 2,677,244 | 5/1954 | Wehby . |
| 2,677,246 | 5/1954 | Wehby . |
| 2,731,807 | 1/1956 | Allyne . |
| 2,756,564 | 7/1956 | Robertson . |
| 2,881,688 | 4/1959 | Breen . |
| 2,973,186 | 2/1961 | Hazard .................... 165/30 |
| 3,015,217 | 1/1962 | Beemer et al. . |
| 3,057,284 | 10/1962 | Learmont . |
| 3,090,209 | 5/1963 | Hubacker ............... 62/186 |
| 3,180,403 | 4/1965 | Breen . |
| 3,199,579 | 8/1965 | Foster et al. . |
| 3,212,285 | 10/1965 | Wilson . |
| 3,386,260 | 6/1968 | Kirkpatrick . |
| 3,412,571 | 11/1968 | Bolynn . |
| 3,590,911 | 7/1971 | Horvay ................... 165/30 |
| 3,734,169 | 5/1973 | Falk . |
| 3,763,761 | 10/1973 | Anderson et al. . |
| 3,918,269 | 11/1975 | Summers et al. . |
| 4,059,966 | 11/1977 | True, Jr. . |

OTHER PUBLICATIONS

Polar American–Polar–American's, "Cold Air Ceiling".

Primary Examiner—William R. Cline
Assistant Examiner—John K. Ford
Attorney, Agent, or Firm—Merchant, Gould, Smith, Edell, Welter & Schmidt

[57] ABSTRACT

The specification discloses a novel refrigeration/air exchanger unit (30) adapted for use with a main refrigeration unit (28) of a trailer truck (10) including frozen and refrigerated compartments (20, 22) to maintain the refrigerated compartment at a predetermined temperature above freezing without an auxiliary refrigeration unit. The system (30) includes a duct (34) interconnecting the compartments, a fan (44) for drawing cold air from the freezer compartment into the refrigerated compartment to lower the temperature therein, and another fan (62) and associated heating element (72) in the refrigerated compartment for modulating the temperature therein. The fans (44, 56) and heating element (72) are automatically controlled responsive to circuitry including a thermostat (78).

9 Claims, 6 Drawing Figures

4,553,584

REFRIGERATION/AIR EXCHANGER SYSTEM MAINTAINING TWO DIFFERENT TEMPERATURE COMPARTMENTS

TECHNICAL FIELD

The present invention relates generally to a refrigeration/air exchanger system for use with refrigerated vehicles having two compartments which must be maintained at different temperatures. More particularly, this invention concerns an apparatus for use with the main refrigeration unit of a refrigerated trailer truck for ducting some of the cold air from the freezer compartment into the refrigerated compartment responsive to a thermostatically controlled fan and heating element arrangement, to maintain both temperature and humidity control in the refrigerated compartment without an auxiliary refrigeration unit to achieve better operating efficiencies.

BACKGROUND ART

Refrigerated trucks of the semi-trailer type are utilized to supply various grocery stores, and there are numerous such trucks in operation across the country today. These trucks typically include a front freezer compartment for frozen foods and a rear refrigerated compartment for perishables. The compartments are separated by a bulkhead door, which can be moved to vary the relative sizes of the compartments in accordance with the particular load to be carried. It will of course be appreciated that the two compartments must be maintained at different temperatures. In addition, proper humidity must be maintained in the rear refrigerated compartment to keep the perishables fresh.

In the past, the common approach to meeting the different temperature requirements of the two compartments within such refrigerated trucks has been to provide an auxiliary or second refrigeration unit for the rear refrigerated compartment. This of course results in extra expense, control and maintenance problems, and other difficulties. In addition, the use of a separate refrigeration unit for the rear compartment removes moisture and thus lowers the humidity therein, which in turn affects freshness of the perishables and requires additional maintenance in terms of defrosting the evaporator of the unit. There are thus substantial drawbacks to the use of separate auxiliary refrigeration units for the rear refrigerated compartments of refrigerated trailer trucks.

Another approach to this problem has been to utilize thermostatically controlled fan kits in the bulkhead doors separating the compartments, instead of a separate refrigeration unit for the rear compartment. For example, U.S. Pat. No. 3,057,284 to Learmont shows a refrigerated trailer truck incorporating such a bulkhead door fan kit. There are, however, certain difficulties with this approach, one of which is the maintenance of proper temperature distribution within the rear compartment. Perishables located near the bulkhead tend to get too cold or even freeze, while those at the other end of the compartment tend to get too warm. Another problem is that such fan kits are usually supplied by electrical hook-ups which can be dislodged during loading or unloading, or not reconnected after movement of the bulkhead. If the bulkhead door is moved, extra care must be taken to assure that proper electrical connection and hook-up is maintained otherwise there will be little if any refrigeration to the rear compartment. Either of these can result in loss of at least some perishables from spoilage or freeze damage. Bulkhead door fan kits are therefore unsatisfactory for several reasons.

There is thus a need for a refrigeration/air exchanger unit which is not mounted in the bulkhead door but which draws some of the cold air from the freezer compartment by means of an improved thermostatically controlled fan and heater arrangement for achieving proper temperature and humidity control in the refrigerated compartment without the expense and maintenance associated with a separate auxiliary refrigeration unit for that compartment.

SUMMARY OF INVENTION

The present invention comprises a novel apparatus of simplified construction which overcomes the foregoing and other difficulties associated with the prior art. The invention comprises a refrigeration/air exchanger system which can be built-in during construction of new refrigerated truck trailers, or retrofitted to existing refrigerated trailers with minimal modifications. Proper temperature and humidity control is maintained without the additional expense and complication of a separate refrigeration unit for the rear refrigerated compartment. The system apparatus of the invention is adapted for use with the main refrigeration unit connected to the freezer compartment. In particular, the apparatus herein comprises a duct having an inlet located in the freezer compartment and an outlet located in the refrigerated compartment. A thermostatically controlled fan or a pair of fans is located in the duct for drawing cold air into the refrigerated compartment to maintain the desired temperature therein. A recirculation fan and associated thermostatically controlled electrical heating element are provided in the refrigerated compartment for further temperature control and modulation. Cold air from the freezer compartment is thus mixed with the air in the refrigerated compartment without additional refrigeration thereof, which in turn facilitates maintainence of proper temperature and humidity levels therein. There is no evaporator coil in the refrigerated compartment on which moisture would collect, thereby lowering humidity therein. The use of multiple fans improves circulation and temperature distribution. The power supply and controls for the unit are preferably adapted for connection directly to the main refrigeration unit of the trailer.

BRIEF DESCRIPTION OF DRAWINGS

A better understanding of the invention can be had by reference to the following Detailed Description in conjunction with the accompanying Drawings, wherein.

DETAILED DESCRIPTION OF THE DRAWINGS

Figures 1, 2:
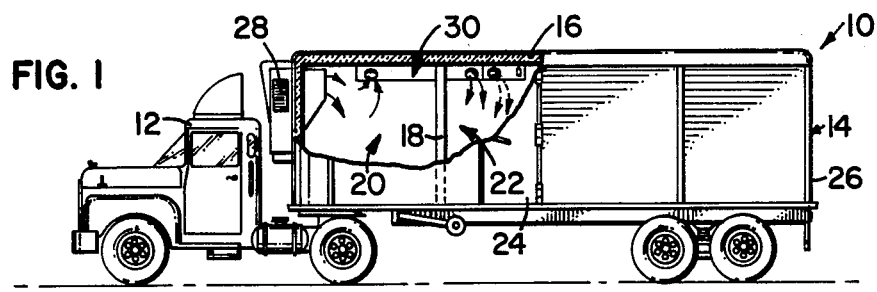
FIG. 1 is a side view (partially cut away) of a refrigerated trailer truck incorporating the invention.
FIG. 2 is a perspective end view of the trailer, with the rear doors and bulkhead door removed.

Referring now to the Drawings, wherein like reference numerals designate like or corresponding elements throughout the views, and particularly referring to FIG. 1, there is shown a tractor trailer truck 10 of the over-the-road type which is typically used for delivering fresh and frozen foods to grocery stores and the like. The truck 10 includes a tractor 12 which is hitched to and hauls a trailer 14. The trailer 14 includes insulation 16 in the roof, floor and walls thereof to insulate the interior of the trailer against the outside ambient temperature. A bulkhead 18 divides the interior of the trailer 14 into a front freezer compartment 20 for frozen goods, and a rear refrigerated compartment 22 for chilled goods and perishables. The bulkhead 18 typically includes a door (not shown) for access between the compartments 20 and 22. Exterior doors 24 and 26 are provided on the side and back end of the trailer 14 to facilitate loading and unloading thereof. A main refrigeration unit 28 is located on the front end of the trailer 14 for cooling the compartments 20 and 22.

The trailer 14 also includes a refrigeration/air exchanger system 30 incorporating the invention. The system 30 is adapted for use with the main refrigeration unit 28 to effect temperature and humidity control in the rear compartment 22 without the use of a second auxiliary refrigeration unit, as will be explained more fully hereinbelow. Although the refrigeration/air exchanger system 30 is described and illustrated herein for use with a refrigerated trailer truck, it will be understood that the invention can also be adapted for use with other refrigerated vehicles, such as refrigerated railway cars.

Figure 3:
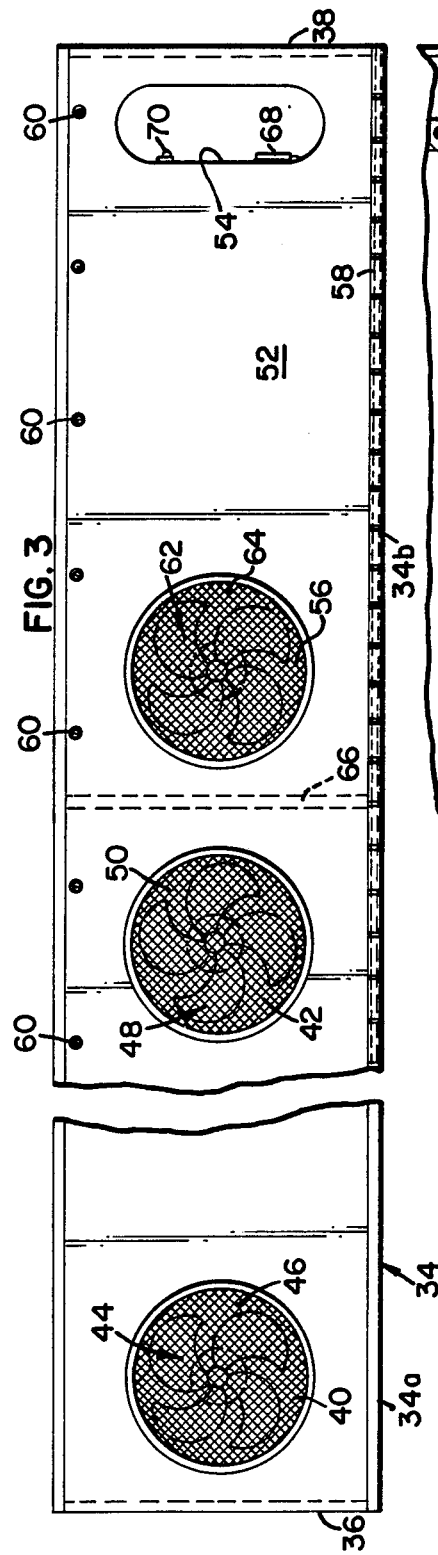
FIG. 3 is an enlarged side view of the duct portion unit of the invention.
Figure 4:
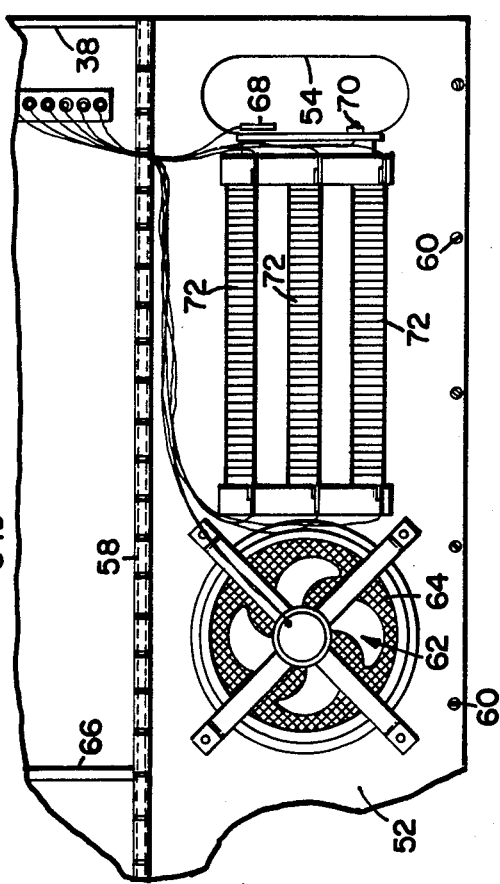
FIG. 4 is a view of the rear portion of the duct, with the hinged cover down.

The structural details of the refrigeration/air exchanger system 30 are shown in FIGS. 2-4. In FIG. 2, the phantom lines 32 indicate the bulkhead 18, which has been omitted for clarity. The unit 30 comprises a duct 34 interconnecting the compartments 20 and 22. The duct 34 includes a front portion 34A extending into compartment 20, and a rear portion 34B extending into compartment 22. The duct 34 can be formed from sheet metal or any other suitable material, and can be located completely internally to trailer 14 as illustrated, or only partially internal thereto. For example, the duct 34 can extend externally along the roof of the trailer 14. As illustrated, the duct 34 is of generally triangular cross-section so as to fit into one of the upper interior corners of the trailer 14. The ends of duct 34 are closed by end plates 36 and 38.

Duct 34 includes an inlet 40 located in the front freezer compartment 20, and an outlet 42 located in the rear refrigerator compartment 22. An electrical fan 44 is located inside the duct 34 at the inlet 40 for drawing cold air from the front compartment 20 and forcing it through the outlet 42 into the rear compartment 22. The electrical fan 44 can be of any suitable construction, such as a model 3048F Leece Neville motor with a model 78-359 fan blade. A protective guard 46 is preferably provided over the inlet 40. If desired, a second electrical fan 48 can be provided in the duct 34 at the outlet 42 to compliment the fan 44. The fan 48 is similar to the fan 40, except that the fan blade thereof is of reverse pitch to urge the cold air outwardly through outlet 42. A protective guard 50 is also preferably provided over the outlet 42. Fans 44 and 48 are thermostatically controlled as will be explained more fully hereinbelow.

The rear portion of the duct 34B includes a cover 52 containing another inlet 54 and another outlet 56, both located in compartment 22. The cover 52 is preferably supported by hinge 58 along the lower side and secured by fasteners 60 along the top side so that it opens downwardly to facilitate access to the components therein for service, etc. A third electrical fan 62 is mounted at the outlet 56 for continuously drawing cool air from the rear compartment 22 inward through the inlet 54 and recirculating it out the outlet 56. A protective guard 64 is preferably provided over the outlet 56. A divider 66 is also provided behind the cover 52 between fans 48 and 62 for separating the front and rear duct portions 34A and 34B. In addition, two temperature sensors 68 and 70 and a thermostatically controlled electrical heating element 72 are located behind the cover 52 at inlet 54 in the rear trailer compartment 22. In contrast to fans 44 and 48, fan 62 is thus a continous recirculation fan.

The outlet 42 and fan 48 are also preferably located on cover 52 for serviceability.

Figure 5:
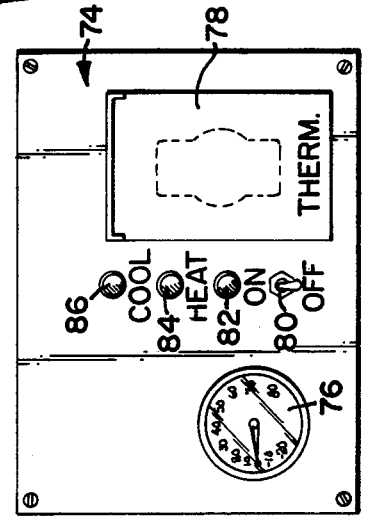
FIG. 5 is a diagram of the control panel.

FIG. 5 shows the control panel 74 for the refrigeration/air exchanger system 30. The control panel 74 includes a thermometer 76, thermostat 78, and on/off switch 80. The thermostat 78 can comprise, for example, a THERMOGUARD device available from Thermoking Corporation of Bloomington, Minn. A suitable thermometer 76 can be obtained from the same source. Indicator lights 82, 84 and 86 are also provided on the control panel 74, which is preferably located directly on the main refrigeration unit 28 outside trailer 14.

Figure 6:
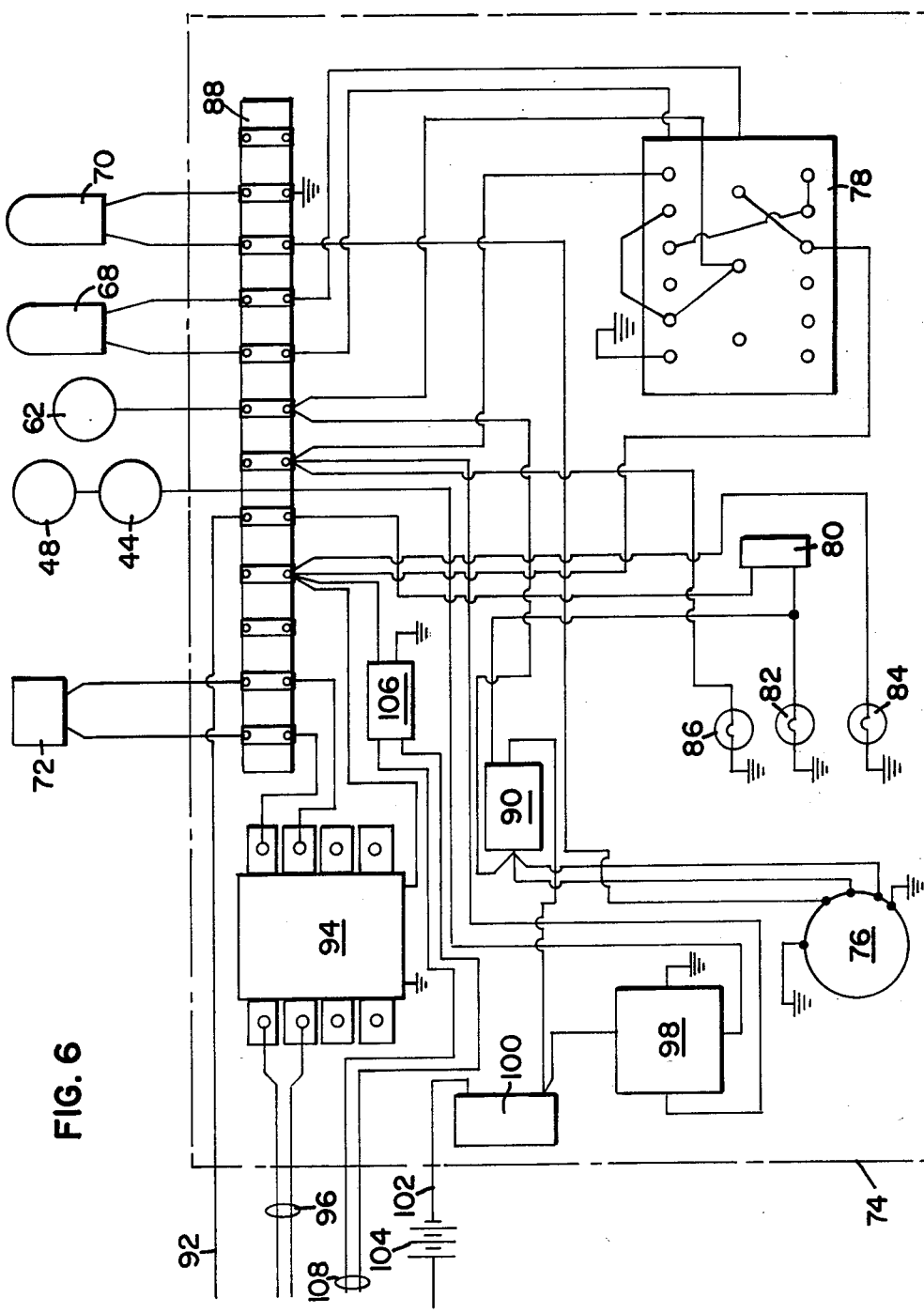
FIG. 6 is schematic diagram of the control circuitry for the refrigeration/air exchanger system herein.

FIG. 6 shows the remainder of the control circuitry for the system 30. The circuitry includes a terminal block 88 through which most of the connections are made. The on/off switch 80 is connected to the indicator light 82 and a run relay 90. A line 92 also connects the on/off switch 80 through the terminal block 88 to the run solenoid (not shown) of the power source for the main refrigeration unit 28 so that system 30 is on when the main unit is on. The thermostat 78 is connected to temperature sensor 68. The thermometer 76 comprises an outside display connected to temperature sensor 70 inside rear duct portion 34B. The electrical resistance heating element 72 is connected to a heat relay 94, which in turn is connected via lines 96 to a 220 volt alternator (not shown) for the main unit 28, as well as to the thermostat 78. The fans 44 and 48 are connected in series to fan relay 98, which in turn is connected between a circuit breaker 100 and the run relay 90. The circuit breaker 100 is also connected via line 102 to a battery 104. The battery 104 serves to energize the run relay 90 and fan relay 98. The fan 62 is connected to the run relay 90 for continuous operation when system 30 is on. It will thus be apparent that fans 44 and 48 together with the heating element 72, are thermostatically controlled.

In accordance with the preferred embodiment, a high speed relay 106 is connected between the themostat 78 and heat relay 94 as shown. The relay 106 is also connected by lines 108 to the speed solenoid (not shown) of the power source for the main refrigeration unit 28 so that the main unit is put in high speed responsive to higher voltage requirements of system 30 when the heat relay 94 is energized. The heat relay 94 is on whenever the heating element 72 is energized by thermostat 78. Further, the thermostat 78 is illustrated as a THERMOGUARD unit wired as shown to provide a null mode so that fans 44 and 48 are off when the temperature within compartment 22 is within a predetermined range centered on the setpoint temperature.

The refrigeration/air exchanger system 30 of the invention operates as follows. It is assumed that the main refrigeration unit 28 is operating to chill the front compartment 20 to a temperature below freezing, such as zero degrees farenheit for example, to prevent thawing of the frozen products therein. The thermostat 78 is set to the desired temperature in the rear compartment 22, such as, for example, about 45 degrees farenheit. Actuation of the on/off switch 80 energizes the system 30. Indicator light 82 comes on when the system 30 is energized. The recirculation fan 62 is on whenever system 30 is energized, thereby drawing air from compartment 22 through inlet 54 and over temperature sensors 68 and 70, and on over the heating element 72, which may or may not be on responsive to thermostat 78, and recirculating the air within compartment 22. The thermometer 76 displays the temperature in compartment 22 as sensed by sensor 70. The fans 44 and 48 and the heating element 72 are controlled by the thermostat 78 to maintain the desired temperature in compartment 22 as actually monitored by sensor 68. Indicator light 86 comes on when fans 44 and 48 are on. Similarly, indicator light 84 comes on when heating element 72 is energized, which would occur when it is necessary to warm the air in compartment 22 slightly for better temperature modulation, such as, for example, when the outside ambient temperature is relatively low. No moisture is removed from compartment 22 whereby humidity is maintained for freshness of the perishable goods.

From the foregoing, it will thus be apparent that the present invention comprises a unique refrigeration/air exchanger unit having several advantages over the prior art. The unit herein is particularly adapted for use with the main refrigeration units of refrigerated truck trailers. Better temperature and humidity control within the refrigerated compartment is accomplished without the expense and complication of a second auxiliary refrigeration unit. Better operating efficencies are realized by means of the invention, which can be built-in during manufacture as original equipment, or retrofitted to existing equipment. Other advantages will be evident to those skilled in the art.

Although particular embodiments of the invention have been illustrated in the accompanying Drawings and described in the foregoing Detailed Description, it will be understood that the invention is not limited to the embodiments disclosed, but is intended to embrace any alternative, modifications, rearrangements and/or rearrangements of elements falling within the scope of the invention as defined by the following claims.

What is claimed is:

1. Apparatus for use with a vehicle having first and second compartments and a main refrigeration unit for maintaining the first compartment at a predetermined temperature below freezing, which comprises:
   a duct fluidly interconnecting the first and second compartments, said duct having a first duct portion extending between the first and second compartments and a second duct portion extending only in said second compartment;
   the first portion of said duct having a first inlet and outlet both located in said first and second compartments, respectively, and the second portion of said duct having a second inlet and outlet both located in said second compartment;
   a divider wall in said duct to isolate the first and second duct portions from fluid communication;
   a cooling fan located in said first duct portion between said first inlet and outlet for selectively drawing cold air from said first compartment into said second compartment;
   a recirculation fan located in said second duct portion between said second inlet and outlet for continuously recirculating air in said second compartment;
   a heating element associated with said recirculation fan in said second duct portion between the second inlet and outlet; and
   means including a thermostat and associated temperature sensor for controlling said cooling fan and said heating element to maintain the temperature in said second compartment at a predetermined temperature relatively higher than the temperature in said first compartment.

2. The apparatus of claim 1, wherein said duct extends between said compartments entirely internal to the vehicle.

3. The apparatus of claim 1, wherein said cooling fan is located at the first inlet of said duct, and further including a protective guard mounted over the first inlet.

4. The apparatus of claim 1, wherein said control means includes:
   a second temperature sensor located in said second compartment;
   an external display connected to said second temperature sensor;
   an on/off switch connected to a power supply;
   a first indicator light connected to said on/off switch for indicating when the apparatus is energized;
   a second indicator light connected to said cooling fan for indicating when said fan is operating and thus drawing cold air into said second compartment; and
   a third indicator light connected to said heating element for indicating when the temperature in said second compartment is being modulated.

5. A refrigeration/air exchanger system for use with a vehicle having first and second compartments, comprising:
   a refrigeration unit connected to said compartment for maintaining the temperature therein at a first predetermined temperature below freezing;
   a straight, internal duct fluidly interconnecting said first and second compartments, said duct having a first duct portion extending between the first and second compartments and a second duct portion extending only in said second compartment;
   the first portion of said duct having an inlet and outlet located in said first and second compartments, respectively, and the second portion of said duct having a second inlet and outlet both located in said second compartment;
   a divider in said duct to isolate the first and second duct portions from fluid communication;
   a cooling fan located in said first duct portion between said first inlet and outlet for selectively drawing cold air from said first compartment into said second compartment;
   a recirculation fan located in said second duct portion between said second inlet and outlet for recirculating air in said second compartment;
   a heating element associated with said recirculation fan in said second duct portion between the second inlet and outlet; and
   means including a thermostat and associated temperature sensor for controlling said cooling fan and said heating element to maintain the temperature in said second compartment at a second predetermined temperature above freezing.

6. The refrigeration/air exchanger system of claim 5, wherein said duct is of generally triangular cross-section adapted for location in an internal corner of the vehicle extending between said first and second compartments.

7. The refrigeration/air exchanger system of claim 5, wherein said control means includes:
- a second temperature sensor located in said second compartment;
- an external display connected to said second temperature sensor;
- an on/off switch connected to a power supply;
- a first indicator light connected to said on/off switch for indicating when the apparatus is energized;
- a second indicator light connected to said cooling fan for indicating when said fan is operating and thus drawing cold air into said second compartment; and
- a third indicator light connected to said heating element for indicating when the temperature in said second compartment is being modulated.

8. The refrigeration/air exchange system of claim 5 further including:
- a hinged cover in a portion of said duct extending into said second compartment;
- said second inlet and outlet, recirculation fan, and heating element being mounted on said cover to facilitate access thereto when said cover is in an open position; and
- means for releasably securing said cover in a closed position.

9. A refrigeration/air exchanger system for a trailer having front and rear compartments separated by a bulkhead, comprising:
- a main refrigeration unit for cooling the front compartment to a predetermined first temperature below freezing;
- a duct fluidly interconnecting said front and rear compartments, said duct having a first duct portion extending between the first and second compartments and a second duct portion extending only in said second compartment;
- the first portion of said duct having an inlet and outlet located in said front and rear compartments, respectively, and the second portion of said duct having a second inlet and outlet both located in said rear compartment;
- a divider in said duct to isolate the first and second duct portions from fluid communication;
- a cooling fan located in said duct between said first inlet and outlet for drawing cold air from said front compartment into said rear compartment;
- a recirculation fan located in said duct between said second inlet and outlet for continously recirculating air in said rear compartment;
- an electrical heating element located in said second duct portion between the second inlet and said recirculation fan; and
- means for controlling said cooling fan and heating element to maintain the temperature in said rear compartment at a predetermined second temperature above freezing, said control means including:
- first and second temperature sensors located in said rear compartment;
- a thermostat connected between said first temperature sensor and said cooling fans and said heating element;
- a display connected to said second temperature sensor; and
- an on/off switch connected to a power supply.

* * * * *